United States Patent Office 3,635,915
Patented Jan. 18, 1972

3,635,915
COPOLYMERS OF MALEIC ACID AND ACRYLIC ACID
Donald J. Gale, Spartanburg, S.C., assignor to Deering Milliken Research Corporation, Spartanburg, S.C.
No Drawing. Filed Nov. 28, 1969, Ser. No. 880,972
Int. Cl. C08f 15/36
U.S. Cl. 260—78.5 R
10 Claims

ABSTRACT OF THE DISCLOSURE

Copolymers of maleic acid and acrylic acid are prepared by polymerizing a mixture of maleic acid and acrylic acid in water in the presence of a polymerization catalyst. The copolymers produced in this manner are water-soluble, clear and flexible, and are useful as surface coatings. The copolymers are particularly useful as textile sizing compositions for fibers and yarns.

BACKGROUND OF THE INVENTION

This invention relates to copolymers of maleic acid, and more particularly, to copolymers of maleic acid with acrylic acid prepared in an aqueous medium. The aqeous copolymer solutions obtained are useful for coating a wide variety of substrates.

Copolymers of maleic compounds with ethylenically unsaturated monomers such as the copolymer of styrene and maleic anhydride have been known for some time. The majority of these copolymers are based on maleic anhydride and the polymerizations are carried out in organic solvent systems. A few recently issued patents have described the preparation of copolymers of maleic acid with other polymerizable ethylenically unsaturated compounds in aqueous media. For example, in U.S. Pat. 3,436,363, the polymerization of ethylene with such acids as acrylic or maleic acid has been described. However, even though water is included in the reaction mixture, there is a substantial amount of a water-soluble organic liquid such as tertiary-butanol incorporated into the reaction mixture. After polymerization is completed, the solvent or organic liquid is removed. U.S. Pat. 3,432,455 describes the emulsion polymerization of unsaturated monomers utilizing bivalent metal emulsifiers. These particular emulsifiers are reported to be necessary in the polymerization in order to obtain lactices having larger particle sizes and lower viscosities.

Sizing compositions have been used in the textile industry for lubricating yarns and fibers to assure, among other things, free delivery of the yarn or fibers without plucks and jerks through the weaving or knitting operations. An ideal sizing composition should be stable, essentially odorless and colorless, non staining, and it should be easily removable from the yarn. Many compositions have been suggested as being useful as sizing compositions and these include natural as well as synthetic materials. Starch is an example of a naturally occurring, widely used textile sizing composition. Synthetic polymer materials such as polyurethanes and polymers of acrylic acid have been utilized in sizing especially synthetic textile yarns such as those composed of Dacron or Nylon. Although polyacrylic acid has been utilized for sizing nylon yarns, its use has been impaired somewhat by the brittleness of the film deposited on the yarns and its cohesive properties.

SUMMARY OF THE INVENTION

In accordance with the present invention, copolymers of maleic acid and acrylic acid are prepared which are clear and flexible. These copolymers have found particular utility as sizing compositions for synthetic yarns and fibers such as nylon.

DESCRIPTION OF THE PREFERRED EMBODIMENTS

The copolymers of this invention are prepared by polymerizing a mixture of maleic acid, acrylic acid and a polymerization catalyst in water as the reaction medium. The maleic acid may be introduced into the mixture either as maleic acid or as maleic anhydride which is readily converted into the acid form in water. The weight ratio of acrylic acid to maleic acid in the reaction mixture may be varied to produce copolymers having desirable physical properties. Generally, the monomer mixture contains from about 50–95 parts of acrylic acid and from 5–50 parts of maleic acid. The polymerization of this monomer mixture is effected by introducing a polymerization catalyst and heating at a temperature and for a period of time sufficient to effect the polymerization.

The catalysts, promoters and activators conventionally employed in the polymerization of ethylenically unsaturated compounds may be used in the process of the invention. That is, the polymerization reaction of this invention is similar to other polymerization processes since it is initiated by a free radical producing agent such as the peroxygen compounds including persulfates or perborates, organic or inorganic peroxides such as benzoyl peroxide, di-t-butyl peroxides, hydrogen peroxide, and the hydroperoxides such as cumene hydroperoxide. The easily decomposable organic nitrogen compounds (azo catalysts) such as azodicarboxylic acid amide or azobisisobutyronitrile are useful.

Salts of inorganic peracids are particularly useful as catalysts and these include, for example, ammonium persulfate, potassium persulfate, sodium percarbonate, potassium percarbonate, sodium perborate, potassium perborate, sodium perphosphate and potassium perphosphate.

The peroxides and peracids described above, particularly the salts of the inorganic peracids, may be utilized alone to initiate the polymerization process, although faster reactions at lower temperatures may be conducted when these oxidizing agents are combined with a reducing agent to form a redox catalyst system. The reducing agents may be iron compounds such as the ferrous salts including the sulfates, acetates and phosphates; metallic formaldehyde sulfoxylates such as zinc formaldehyde sulfoxylate; alkali-metal sulfites such as sodium and potassium bisulfite, sulfites, metabisulfite or hydrosulfites; sulfur-containing acids such as thioglycollic acid and its water-soluble salts; mercaptans such as hydrogen sulfide and sodium or potassium hydrosulfide; alkanol amine sulfide such as monoethanolamine sulfite and monoisopropanolamine sulfite. A sufficient amount of the catalyst is used to effect the copolymerization of the acid and the acrylic acid to give the desired product. Generally, from about 0.05–3.0% by weight based on the combined weight of the monomers is adequate although higher amounts, up to about 10%, may be utilized.

The mixture of the monomers and catalyst is heated to a temperature of from about 50–100° C. and preferably from about 70–100° C. to effect the polymerization. The time required for the polymerization reaction is dependent in part on the temperature. The higher the temperature of the reaction, the quicker is the rate of polymerization. It also has been found that the nature of the copolymer prepared by the process of the invention is influenced by other factors, such as the catalyst to monomer ratio and the weight ratio of the maleic acid and acrylic acid in the copolymer. It has been found, for example, that the viscosity of aqueous solutions of copolymers decreases as the reaction temperature increases. With minimum experimentation, it is possible to prepare copolymers of any given viscosity utilizing various weight ratio of acrylic acid to maleic acid by varying the temperature of the polymerization reaction and the ratio of catalyst to monomer charge.

The copolymers of this invention are characterized by the viscosity of an aqueous solution containing from about 25–35% of the copolymer and preferably about 30% of the copolymer at a temperature of 25° C. It is well-known that the viscosity of a polymer solution is related to the molecular weight of that polymer, the higher the viscosity, the higher the molecular weight. Aqueous solutions containing about 30% of the copolymer of the invention are characterized by viscosities of from about 50–100,000 centipoises or more at a temperature of about 25° C. The viscosities reported in this specification were measured with a Brookfield viscometer, varying the spindle size and speed to accommodate the different viscosities.

The polymerization reaction may be terminated in order to obtain products having desired viscosities by introducing short-stopping agents when the desired degree of polymerization has been obtained. Examples of such agents include the salts of methyldithiocarbamic acid, hydroquinone and other agents well-known in the art. When oxidizing agents such as the peroxides and the persulfates are utilized as catalysts for the polymerization, the reaction may be terminated by the introduction of a reducing agent such as sodium bisulfite followed by cooling of the reaction mixture.

In some instances, it is desired to partially neutralize the copolymer of the invention. Thus, the aqueous solutions obtained in the invention may be treated with a given amount of a volatile basic compound such as ammonium hydroxide which reacts with and neutralizes a given amount of the acid groups in the copolymer. On evaporation, the ammonia volatilizes leaving the free acid groups. Copolymer solutions of this invention partially neutralized with ammonium hydroxide are found to be especially desirable as sizing compositions for nylon fibers, filaments and yarns.

The polymerization reaction of this invention may be carried out by any known technique. For example, the monomers and catalysts may be mixed with water and heated to the polymerization temperature. Alternatively and preferably, a mixture of the monomers and the catalyst is added slowly to a reaction vessel containing water and additional catalyst heated to the polymerization temperature. After all of the monomer mixture is added, the mixture is heated for an additional period and the polymerization reaction is terminated such as by the addition of the short-stopping agent and cooled.

The following examples illustrate processes for preparing the copolymers of the invention. Unless otherwise indicated, all parts and percentages are by weight. Viscosities are determined with a Brookfield viscometer utilizing a number 2 spindle at 30 r.p.m.

EXAMPLE I

A monomer mixture of 227.9 parts of acrylic acid, 82.1 parts of maleic anhydride and 243.3 parts of water is prepared and stirred until the maleic anhydride is in solution. To this mixture is added a solution comprising 1.1 parts of ammonium per sulfate and 20 parts of water.

Into a separate reaction vessel there is placed 362.5 parts of water which is heated to a temperature of about 95–97° C. A solution of 0.55 part of ammonium persulfate and 10 parts of water is added to the reaction vessel followed by the addition of the aqueous monomer mixture prepared above. The addition of the monomer mixture requires about 2.5–3 hours and the temperature of the ingredients in the reaction vessel is maintained at a temperature of about 95–97° C. throughout the addition. After completion of the addition of the monomer mixture, the reaction mixture is maintained at 95° C. for about 10 minutes whereupon a solution of 0.55 part of sodium bisulfite in 20 parts of water is added and the reaction mixture is cooled. When the temperature of the reaction mixture reaches about 60–65° C., 32 parts of ammonium hydroxide is added to the mixture with stirring. The reaction vessel contains the desired product, an aqueous solution of the copolymer containing 31.6% solids and having a pH of 1.9 and the viscosity of about 625 centipoises at 25° C. Upon evaporation of the water from the product, there is produced a clear, flexible film of the copolymer.

EXAMPLE II

The procedure for Example I is repeated except that the maleic anhydride is replaced by 97.7 parts of maleic acid. The solution prepared in this manner, having a solids content of 31.4%, has a pH of 1.9 and a viscosity of 562 centipoises at 25° C.

EXAMPLE IIII

A monomer mixture comprising 522 parts of acrylic acid, 77.5 parts of maleic anhydride and 815.5 parts of water is prepared and stirred until all of the maleic anhydride is in solution. Into a reaction vessel there is added 353 parts of water which is heated to a temperature of about 95° C., and a catalyst solution comprising 1.2 parts of ammonium persulfate in 13.7 parts of water is added to the reaction vessel while maintaining the temperature at about 95° C. Another catalyst solution comprising 2.4 parts of ammonium persulfate and 82.5 parts of water is added to the monomer mixture, and this monomer mixture is added to the reaction vessel over a period of 2.5–3 hours while maintaining the temperature of the ingredients of the reaction vessel at about 95° C. After all of the monomer mixture is added, the reaction temperature is maintained at about 95° C. for 10 minutes whereupon a solution comprising 1.2 parts of sodium bisulfite in 63 parts of water is added. Upon completion of the addition of the bisulfite solution, the reaction mixture is cooled to a temperature of about 60–65° C. and 68 parts of ammonium hydroxide is added slowly. The clear aqueous copolymer solution prepared in this manner has a solids content of about 30%, a pH of about 3.0 and a viscosity of about 900 centipoises. The ratio of acrylic acid to maleic acid in the polymer is 85:15. Films prepared from this solution were clear and flexible.

EXAMPLE IV

Into a 3 liter flask there is placed 322 parts of water which is heated to a temperature of 93–94° C. A solution of 0.45 part of ammonium persulfate and 2 parts water is added to the flask. A monomer mixture comprising 349 parts of acrylic acid, 156.6 parts of maleic anhydride and 826.4 parts of water is prepared and combined with a mixture comprising 4.05 parts of ammonium persulfate in 40.0 parts of water. The monomer mixture is added to the reaction flask in a drop-wise manner while maintaining the reaction temperature between 96° and 100° C. After all of the monomer is added, the mixture is stirred an additional ten minutes at this temperature whereupon a mixture of 0.5 part of sodium bisulfite in 30 parts of water is added with stirring. The mixture is cooled to a temperature of about 60° C. and 59.7 parts of ammonium hydroxide (29% ammonia in water) is added. The clear aqueous copolymer solution prepared in this manner has a solids content of 31%, a pH of 1.9 and a viscosity of 96 centipoises.

EXAMPLE V

The procedure of Example IV is repeated except that the reaction is carried out at a temperature of between 70–75° C. The solution prepared in this manner has a viscosity of 30,000 cetipoises.

EXAMPLE VI

Water (310 parts) is placed in a reaction vessel and a solution comprising 0.45 part of ammoniun per sulfate and 5 parts of water is added. The mixture is heated to a temperature of 70° C. whereupon a mixture of 323.5 parts of acrylic acid, 182.1 parts of maleic anhydride and 806.4 parts of water is added all at once. A solution of 4 parts of ammonium persulfate and 40 parts of water is then added and the reaction mixture is heated to a temperature of 65° C. At this temperature an exothermic reaction occurs and the viscosity increases rapidly. After 10 minutes of additional heating, the temperature is 81° C. and the mixture is highly viscous. A bisulfite solution comprising 0.5 part of sodium bisulfite in 28 parts of water is added to the reaction mixture. The mixture is heated an additional 10 minutes, cooled, and neutralized with 46 parts of ammonium hydroxide solution. The clear solution prepared in this manner containing about 30% solids and having a weight ratio of acrylic acid to maleic acid of 60:40, has a pH of 1.5 and a viscosity of 43,000 centipoises at a temperature of 25° C. The copolymer film obtained after evaporating the water is clear and flexible.

EXAMPLE VII

The procedure of Example I is repeated except that a weight ratio of acrylic acid to maleic acid is 80:20, and the amount of ammonium persulfate used is 2.52% by weight based on the combined weight of acrylic acid and maleic anhydride. The aqueous copolymer solution obtained in this manner containing 30% solids has a viscosity of 100 centipoises at 25° C. and a pH of 2.8.

EXAMPLE VIII

The procedure of Example I is repeated and except that the weight ratio of acrylic acid to maleic acid is 90:10, 0.59% of ammonium persulfate is used based on the combined weight of the acids and the reaction temperature is maintained at 85° C. The aqueous copolymer solution obtaind in this manner containing about 30% solids has a viscosity of 4,810 centipoises at 25° C. as measured with a number 3 spindle at 12 r.p.m. A film obtained from this copolymer solution is flexible and clear.

EXAMPLE IX

The procedure of Example VIII is repeated except that the weight ratio of acrylic acid to maleic acid is 95:5. The copolymer solution obtained in this manner has a viscosity of 6,430 centipoises at 25° C. as determined with a number 3 spindle at 12 r.p.m.

EXAMPLE X

The procedure of Example I is repeated except that the amount of ammonium persulfate used, based on the combined weight of acrylic acid and maleic anhydride is 0.61%, and the reaction temperature is maintained at 70° C. The copolymer solution obtained in this manner, containing 30% solids, has a solution viscosity of 2,904 centipoises and a pH of 1.7.

EXAMPLE XI

The procedure of Example X is repeated except that the reaction temperature is maintained at 80° C. The copolymer solution prepared in this manner has a solution viscosity of 1,040 centipoises and a pH of 1.6.

EXAMPLE XII

The procedure of Example XI is repeated except that the weight ratio of acrylic acid to maleic acid is 80:20. A copolymer solution obtained in this manner has a viscosity of 6,150 centipoises at 25° C.

The copolymer solutions of this invention are useful in the preparation of films, sheets, and coatings. More particularly, the aqueous solutions are useful in coating paper, textile finishing, polishes, in surface coatings such as for example, paints and industrial finishes, and viscosity index improvers for lubricating compositions. In contrast to the polymers obtained from the individual monomers, that is, polyacrylic acid which is brittle, the copolymers of this invention have been found to form clear and flexible films. Physical mixtures of polyacrylic acid and maleic acid produce less desirable films in that they are cloudy rather than clear.

The copolymer solutions prepared in accordance with the process of this invention has been found to be especially useful as sizing compositions for low twist, filament nylon. Sizing the filament nylon with solutions of copolymers of this invention may be performed with the usual procedures and conventional equipment. No special technique is required. Any temperature between room temperature and the boil may be utilized. The copolymers exhibit good adhesion to the nylon and reduced cohesion between individual filaments thus improving the efficiency of weaving and knitting operations. Fabrics prepared from such sized low-twist filament nylon exhibit improved appearance.

What is claimed is:
1. Water-soluble copolymers of maleic acid and acrylic acid prepared by the process comprising
 (a) preparing a mixture consisting essentially of maleic acid, acrylic acid, water and a chemical polymerization catalyst,
 (b) heating the aqueous mixture to a temperature of from about 50° to 95° C. for a period of time sufficient to effect the polymerization, and
 (c) removing the water.
2. The copolymer of claim 1 wherein the catalyst is an inorganic peracid salt.
3. The copolymer of claim 1 wherein the mixture contains from about 50 to 95 parts of acrylic acid and from about 5 to 50 parts of maleic acid.
4. The copolymer of claim 3 wherein the maleic acid is introduced into the mixture as maleic anhydride.
5. The copolymer of claim 2 wherein the peracid salt is ammonium persulfate.
6. The copolymer of claim 1 wherein the catalyst is present in the mixture in an amount of from about 0.05 to 3% by weight based on the weight of the combined acid.
7. An aqueous copolymer solution having a solution viscosity of from about 50 to 100,000 centipoises or more measured at concentrations of from about 30 to 35 weight percent at a temperature of about 25° C. prepared by the process comprising polymerizing an aqueous mixture of maleic acid and acrylic acid at a temperature of from about 70° to 95° C. in the preesnce of a polymerization catalyst.
8. The copolymer and mixture of claim 7 wherein the mixture contains from about 50 to 95 parts of acrylic acid and 5 to 50 parts of maleic acid.
9. The copolymer and mixture of claim 7 wherein the weight ratio of acrylic acid to maleic acid is 70:30.
10. The copolymer and mixture of claim 7 wherein the viscosity is between about 500 and 2,000 centipoises.

References Cited
UNITED STATES PATENTS

| | | | |
|---|---|---|---|
| 3,410,835 | 11/1968 | Mazzolini et al. | 260—78.5 |
| 3,426,004 | 2/1969 | Wagner | 260—80.3 |
| 3,436,363 | 4/1969 | Helin | 260—29.6 |

JOSEPH L. SCHOFER, Primary Examiner

J. KNIGHT III, Assistant Examiner

U.S. Cl. X.R.

260—29.6 RB